US012691843B2

(12) United States Patent
Le et al.

(10) Patent No.: US 12,691,843 B2
(45) Date of Patent: Jul. 28, 2026

(54) IN-VEHICLE MOTION IDENTIFICATION WITH ULTRAWIDEBAND RADAR

(71) Applicant: Ford Global Technologies, LLC, Dearborn, MI (US)

(72) Inventors: Jialiang Le, Canton, MI (US); Jun Lin, Westland, MI (US); Ali Hassani, Ann Arbor, MI (US); Vivekanandh Elangovan, Canton, MI (US); Collin Hurley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 18/436,258

(22) Filed: Feb. 8, 2024

(65) Prior Publication Data

US 2025/0256673 A1 Aug. 14, 2025

(51) Int. Cl.
| | |
|---|---|
| *B60R 21/015* | (2006.01) |
| *B60W 50/14* | (2020.01) |
| *G01S 13/02* | (2006.01) |
| *G06F 17/14* | (2006.01) |

(52) U.S. Cl.
CPC .. *B60R 21/01542* (2014.10); *B60R 21/01534* (2014.10); *B60W 50/14* (2013.01); *G01S 13/0209* (2013.01); *G06F 17/142* (2013.01); *B60W 2050/146* (2013.01)

(58) Field of Classification Search
CPC ....... B60R 21/01542; B60R 21/01534; B60W 50/14; B60W 2050/146; G01S 13/0209; G01S 7/415; G01S 7/417; G01S 13/56; G01S 13/931; G06F 17/142
See application file for complete search history.

(56) References Cited

U.S. PATENT DOCUMENTS

| | | | |
|---|---|---|---|
| 10,735,298 | B2 | 8/2020 | Chen et al. |
| 11,707,197 | B2 | 7/2023 | Shouldice et al. |
| 2020/0297955 | A1 | 9/2020 | Shouldice |
| 2022/0007965 | A1 | 1/2022 | Tiron et al. |
| 2022/0075051 | A1 | 3/2022 | Woo et al. |
| 2022/0373646 | A1* | 11/2022 | Nguyen ................. G01S 7/415 |

(Continued)

FOREIGN PATENT DOCUMENTS

| | | | | |
|---|---|---|---|---|
| CN | 115512071 A | * | 12/2022 | ........... G06F 17/142 |
| CN | 115856769 A | | 3/2023 | |

(Continued)

OTHER PUBLICATIONS

CN-115512071-A—Eng. Trans. (Year: 2021).*

(Continued)

*Primary Examiner* — Abby Lin
*Assistant Examiner* — Renee LaRose
(74) *Attorney, Agent, or Firm* — Frank Lollo; Brooks Kushman P.C.

(57) ABSTRACT

A computer includes a processor and a memory, the memory storing instructions executable by the processor to receive radar data from an ultrawideband radar in a passenger compartment of a vehicle, determine a starting-time for a time-window based on a second derivative of the radar data, identify a motion inside the passenger compartment based on the radar data received during the time-window, and actuate a component of the vehicle based on the identification of the motion.

19 Claims, 4 Drawing Sheets

(56) References Cited

U.S. PATENT DOCUMENTS

| | | | | |
|---|---|---|---|---|
| 2023/0168364 A1* | 6/2023 | Podkamien | ........... | G01S 13/582 |
| | | | | 701/45 |
| 2023/0190140 A1* | 6/2023 | Tiron | ..................... | A61B 5/746 |
| | | | | 600/534 |
| 2024/0175982 A1* | 5/2024 | Cong | ..................... | G01S 13/56 |

FOREIGN PATENT DOCUMENTS

| | | |
|---|---|---|
| CN | 116461456 A | 7/2023 |
| WO | 2022184216 A1 | 9/2022 |

OTHER PUBLICATIONS

UWB-radar-based synchronous motion recognition using time-varying range-Doppler images, Wang (Year: 2019).*

Brishtel, I. et al., "Driving Activity Recognition Using UWB Radar and Deep Neural Networks," MDPI sensors, Jan. 10, 2023, 15 pages.

Chen, Y., et al., "Non-Contact In-Vehicle Occupant Monitoring System Based on Point Clouds from FMCW Radar," MDPI technologies, Mar. 13, 2023, 23 pages.

Gharamohammadi, A., et al., "In-vehicle Monitoring by Radar: A Review," IEEE Sensors Journal, Nov. 2023, 26 pages.

Robaszkiewicz, M. "Saving Lives When Temperatures Rise In-cabin UWB Radar to Ensure Everyone's Out of a Parked Car," NXP, White Paper, In-Cabin UWB Radar, 2022, 5 pages.

Leem, S. K., "Vital Sign Monitoring and Mobile Phone Usage Detection Using IR-UWB Radar for Intended Use in Car Crash Prevention," MDPI sensors, 2017, 25 pages.

Zhang, R. et al., "Physics-informed multi-LSTM networks for metamodelingof nonlinear structures," Science Direct, Computer Methods in Applied Mechanics and Engineering, Sep. 1, 2020, 6 pages.

* cited by examiner

400

IN-VEHICLE MOTION IDENTIFICATION WITH ULTRAWIDEBAND RADAR

BACKGROUND

Some radars use an ultrawideband signal, e.g., a signal with a low energy level spread over a large range of the radio spectrum. The Federal Communications Commission and the International Telecommunications Union Radiocommunication Sector define "ultrawideband" as an antenna transmission for which emitted signal bandwidth exceeds the lesser of 500 MHz or 20% of the arithmetic center frequency.

DETAILED DESCRIPTION

Figure 1:
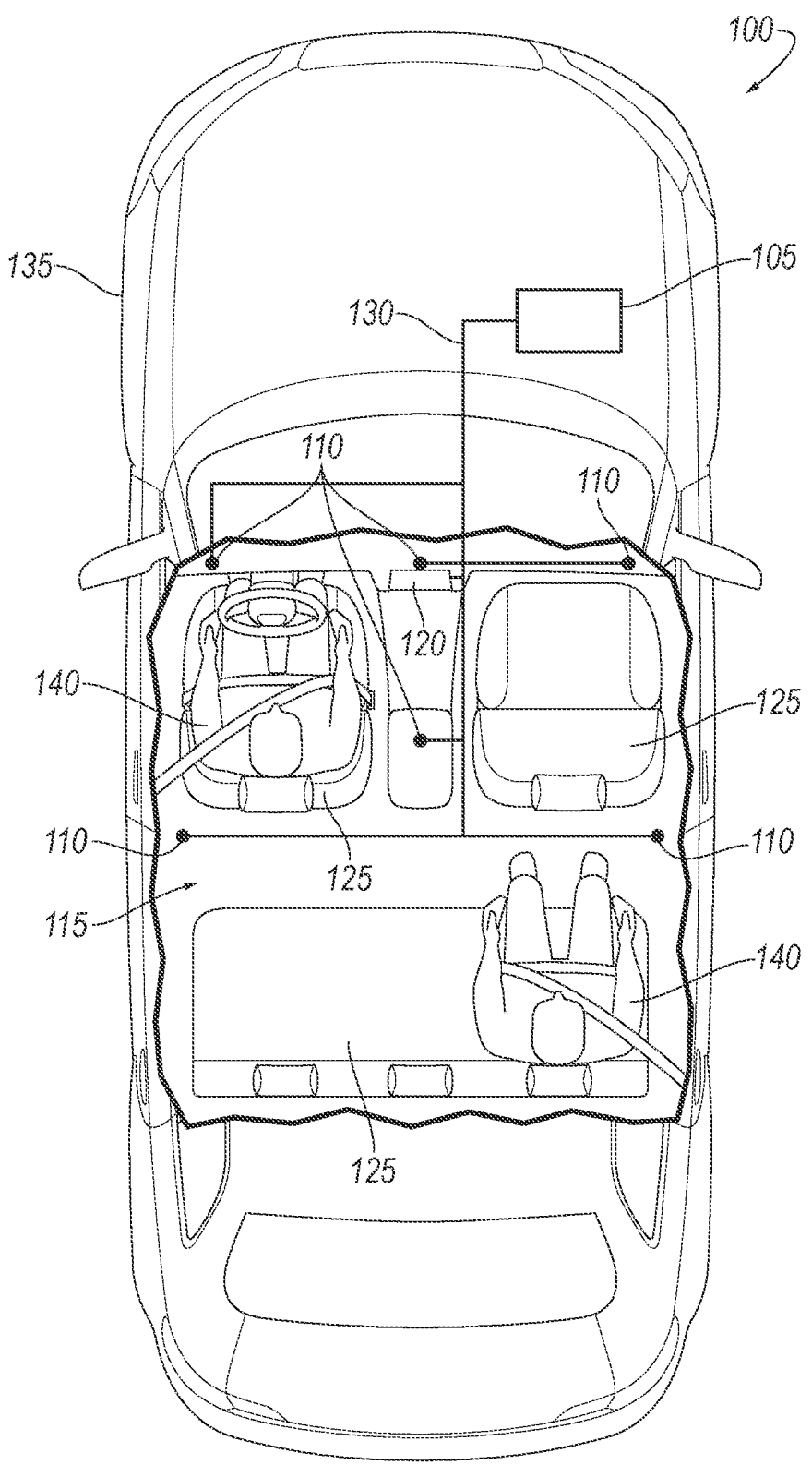
FIG. 1 is a top diagrammatic view of an example vehicle with a passenger compartment exposed for illustration.

This disclosure describes techniques for controlling a vehicle based on identifying motions inside a passenger compartment of the vehicle, e.g., respiration by an occupant, a person entering or exiting the passenger compartment, etc. The identification is performed on radar data from an ultrawideband (UWB) radar in the passenger compartment. Using a UWB radar is beneficial because UWB radars may be installed on board the vehicle for other uses, e.g., phone-as-a-key (PaaK). A computer of the vehicle is programmed to receive radar data from the UWB radar, determine a starting-time for a time-window based on a second derivative of the radar data, identify a motion inside the passenger compartment based on the radar data received during the time-window, and actuate a component of the vehicle based on the identification of the motion. The dynamic setting of the time-window permits the computer to perform the identification with the radar data from a single time-window. A fixed window, by contrast, may have too little radar data for the identification or may have more radar data than needed for the identification, thereby adding latency. With the motion identified, the computer can, e.g., output an alert to the occupant in response to the motion satisfying a condition.

A computer includes a processor and a memory, the memory storing instructions executable by the processor to receive radar data from an ultrawideband radar in a passenger compartment of a vehicle, determine a starting-time for a time-window based on a second derivative of the radar data, identify a motion inside the passenger compartment based on the radar data received during the time-window, and actuate a component of the vehicle based on the identification of the motion.

In an example, the second derivative of the radar data may be a second derivative of fast time with respect to slow time.

In an example, the instructions may further include instructions to refrain from using the radar data received before the starting-time to identify the motion inside the passenger compartment.

In an example, the instructions may further include instructions to convert the radar data received during the time-window to a frequency domain, and identify the motion in the passenger compartment based on the radar data in the frequency domain. In a further example, the instructions may further include instructions to convert the radar data received during the time-window to the frequency domain by applying a fast Fourier transform.

In an example, the time-window may have a preset duration.

In an example, the instructions may further include instructions to apply a filter to the radar data, and the second derivative may be of the radar data after the application of the filter. In a further example, the filter may be a smoothing filter.

In another further example, the filter may be a bandpass filter isolating frequencies for human respiration.

In an example, the time-window may be a first time-window, the starting-time may be a first starting-time, and the instructions may further include instructions to identify the motion in the passenger compartment based on the radar data received during a second time-window, the second time-window starting at an ending time of the first time-window. In a further example, the instructions may further include instructions to, in response to the second derivative being below a threshold amount for at least a threshold duration, refrain from using the radar data received after a current time-window to identify the motion inside the passenger compartment.

In an example, the instructions may further include instructions to classify the motion as a type of animate bulk motion based on the radar data received during the time-window. In a further example, the instructions may further include instructions to classify the motion as a type of animate bulk motion by executing a neural network classifier with the radar data received during the time-window as an input.

In an example, the instructions may further include instructions to identify a number of respirating individuals based on the radar data received during the time-window.

In an example, the instructions may further include instructions to command a user interface to output an alert to an occupant of the passenger compartment based on the identification of the motion.

A method includes receiving radar data from an ultrawideband radar in a passenger compartment of a vehicle, determining a starting-time for a time-window based on a second derivative of the radar data, identifying a motion inside the passenger compartment based on the radar data received during the time-window, and actuating a component of the vehicle based on the identification of the motion.

In an example, the second derivative of the radar data may be a second derivative of fast time with respect to slow time.

In an example, the method may further include refraining from using the radar data received before the starting-time to identify the motion inside the passenger compartment.

In an example, the method may further include converting the radar data received during the time-window to a frequency domain, and identifying the motion in the passenger compartment based on the radar data in the frequency domain.

In an example, the method may further include commanding a user interface to output an alert to an occupant of the passenger compartment based on the identification of the motion.

With reference to the Figures, wherein like numerals indicate like parts throughout the several views, a computer 105 includes a processor and a memory, the memory storing instructions executable by the processor to receive radar data from an ultrawideband (UWB) radar 110 in a passenger compartment 115 of a vehicle 100, determine a starting-time for a time-window based on a second derivative of the radar data, identify a motion inside the passenger compartment 115 based on the radar data received during the time-window, and actuate a component 120 of the vehicle 100 based on the identification of the motion.

With reference to FIG. 1, the vehicle 100 may be any passenger or commercial automobile such as a car, a truck, a sport utility vehicle, a crossover, a van, a minivan, a taxi, a bus, etc. The vehicle 100 includes the passenger compartment 115, the computer 105, a communications network 130, a plurality of UWB radars 110, and other components 120 such as a user interface.

The vehicle 100 includes the passenger compartment 115 to house occupants 140, if any, of the vehicle 100. The passenger compartment 115 includes one or more seats 125, e.g., one or more of the seats 125 disposed in a front row of the passenger compartment 115 and one or more of the seats 125 disposed in a second row behind the front row. The passenger compartment 115 may also include seats 125 in a third row (not shown) at a rear of the passenger compartment 115. The seats 125 are shown to be bucket seats in the front row and bench seats in the second row, but the seats 125 may be other types. The position and orientation of the seats 125 and components thereof may be adjustable by an occupant 140.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 130. The communications network 130 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the UWB radars 110 and the other components 120 via the communications network 130.

The UWB radars 110 transmit and receive radio waves. The UWB radars 110 use an ultrawideband signal, e.g., a signal with a low energy level spread over a large range of the radio spectrum. The Federal Communications Commission and the International Telecommunications Union Radiocommunication Sector define "ultrawideband" as an antenna transmission for which emitted signal bandwidth exceeds the lesser of 500 MHz or 20% of the arithmetic center frequency. The UWB radars 110 may use any suitable modulation method, e.g., orthogonal frequency-division multiplexing (OFDM), phase-shift keying (PSK), pulse-position modulation (PPM), etc. The UWB radars 110 are configured to transmit UWB waves and receive reflections of those UWB waves to detect physical objects in the environment. The UWB radars 110 may also be configured to communicate wirelessly with mobile devices using UWB waves, e.g., for PaaK functionality. This can be a benefit of using the UWB radars 110 rather than another type of ranging sensor.

The UWB radars 110 are fixedly mounted to a body 135 of the vehicle 100 in the passenger compartment 115. The UWB radars 110 may be spaced apart from each other, e.g., spread over the passenger compartment 115, which may help an ability to distinguish a location when used for trilateration. For example, the UWB radars 110 may include six UWB radars 110, four located at corners of the passenger compartment 115 and two toward a longitudinal centerline of the passenger compartment 115.

The vehicle 100 includes other components 120 that may be actuated by the computer 105, e.g., ignition, brake system, user interface, etc. A user interface presents information to and receives information from an occupant 140 (e.g., the operator) of the vehicle 100. The user interface may be located, e.g., on an instrument panel in the passenger compartment 115 of the vehicle 100, or wherever may be readily seen by the occupant 140. The user interface may include dials, digital readouts, screens, speakers, and so on for providing information to the occupant 140, e.g., human-machine interface (HMI) elements such as are known. The user interface may include buttons, knobs, keypads, microphone, and so on for receiving information from the occupant 140.

Figure 2A:
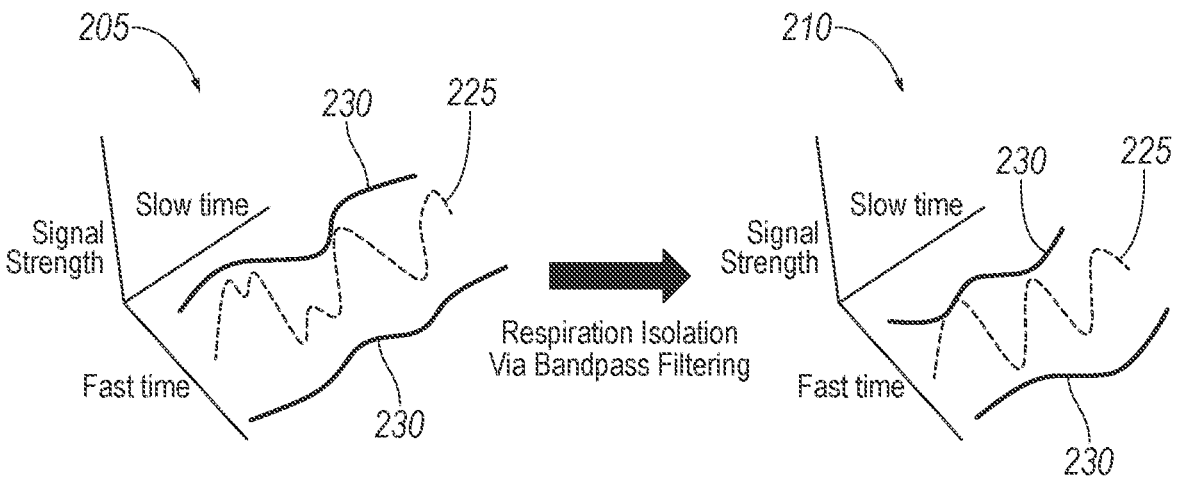
FIG. 2A shows example plots of signal strength and fast time versus slow time for example radar data before and after applying a first filter.
Figure 2B:
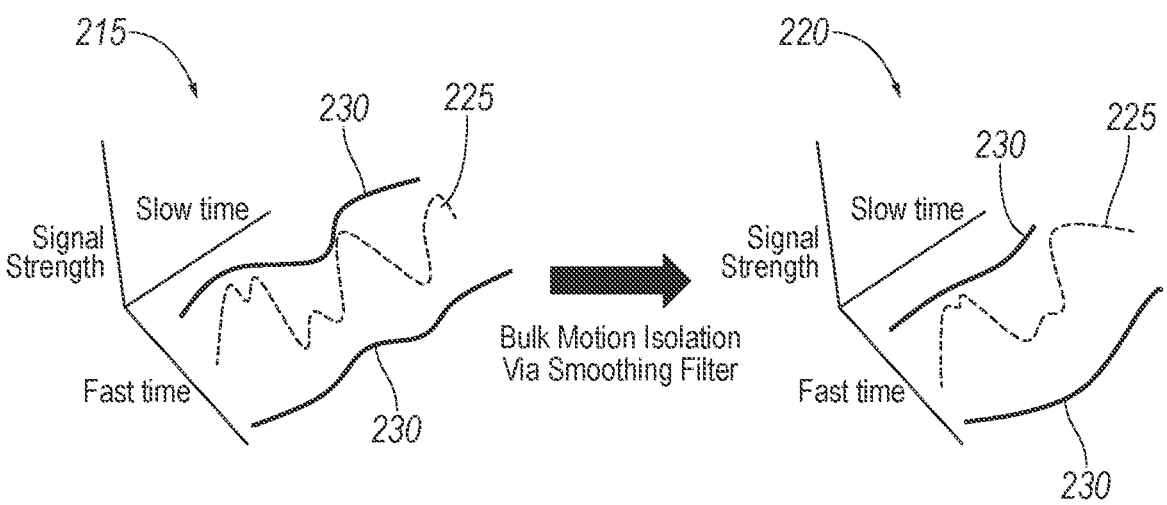
FIG. 2B shows example plots of signal strength and fast time versus slow time for example radar data before and after applying a second filter.

With reference to FIGS. 2A-B, the computer 105 is programmed to receive the radar data from the UWB radars 110, e.g., via the communications network 130. The radar data may include return times for UWB pulses and the strength of those pulses. For example, the radar data may be represented as a plot 205, 215 of slow time versus fast time and signal strength, i.e., slow time is an independent variable and fast time and signal strength are dependent variables, as shown in FIGS. 2A-B. The dimension of slow time is measured in the increments of time at which the UWB pulses are transmitted by the UWB radars 110. The dimension of fast time measures the return time for the pulses and may be measured in increments of time at least an order of magnitude more frequent than slow time. A value of fast time indicates the length of time since the most recent pulse was transmitted. The fast time indicates the distance that a pulse traveled before reflecting back to the UWB radar 110. The signal strength indicates the strength of the pulse, which can be correlated to the distance to the object and the reflectivity of the object.

The radar data may include multiple signals 225, 230 enduring over the slow time dimension. The different signals 225, 230 can indicate different objects in the passenger compartment 115, e.g., the seats 125, the occupants 140, etc. The computer 105 may identify a set of fast time measurements as a signal 225, 230 based on the fast times being sufficiently close together from one unit of slow time to the next unit of slow time, e.g., each consecutive pair of fast time measurements in the set is within a fast-time threshold of each other. The fast-time threshold may be chosen to indicate that the fast time measurements are likely of the same object.

The computer 105 may be programmed to select one or a subset of the signals 225, 230, referred to as the selected signal(s) 225, for the processing that is described below. The computer 105 may select one of the signals 225, 230 based on the signal 225, 230 corresponding to an object that is moving relative to the vehicle 100, e.g., an occupant 140 but not a seat 125. For example, the computer 105 may select the selected signal 225 from the signals 225, 230 based on one or more values characterizing the selected signal 225, e.g., contrast in fast times, variance of fast time over slow time, and/or derivative of fast time with respect to slow time. The contrast of a signal 225, 230 may be a difference between a greatest value of fast time and a smallest value of fast time. The computer 105 may select the selected signal 225 in response to one or more of the values characterizing the signal 225, 230 exceeding a threshold, e.g., peak contrast, variance, contrast normalized by variance, or derivative of fast time with respect to slow time. Alternatively, or additionally, the computer 105 may select the selected signal 225 in response to one or more of the values characterizing the signal 225, 230 being greater for the selected signal 225 than for any of the unselected signals 230.

The computer 105 may be programmed to apply one or more filters to the radar data, e.g. to the selected signal 225. The term "filter" is used herein in its signal processing sense, as a process that removes components or features from a signal (here, the radar data). The filters may be applied to the dimensions of fast time versus slow time in the radar data, i.e., to the radar data indicating distance. The filters may be chosen to isolate data relevant to identifying different types of motion. Multiple filters may be used for different types of motion.

With reference to FIG. 2A, the computer 105 may apply a bandpass filter to the radar data. The term "bandpass filter" is used herein in its signal processing sense, as a filter that passes frequencies within a predefined range and rejects or attenuates frequencies outside the predefined range. The predefined range is stored in the memory of the computer 105, e.g., as a fixed upper bound and fixed lower bound. The bandpass filter may isolate frequencies for human respiration. FIG. 2A shows a first plot 205 of the radar data before applying the bandpass filter on the left and a second plot 210 of the radar data after applying the bandpass filter on the right. For example, the predefined range, e.g., the upper bound and lower bound, may be chosen to cover typical breathing frequencies, e.g., 0.2 to 0.4 Hz. The computer 105 may also apply a gain to the radar data within the predefined range, which can compensate for the small magnitude of movement involved in breathing.

With reference to FIG. 2B, the computer 105 may apply a smoothing filter to the radar data. The smoothing filter may remove noise from the radar data uncorrelated to frequency. FIG. 2B shows a first plot 215 of the radar data before applying the smoothing filter on the left and a second plot 220 of the radar data after applying the smoothing filter on the right. The computer 105 may use any suitable algorithm for smoothing data, e.g., moving average, Savitsky-Golay smoothing filter, local regression, etc.

The computer 105 may use the radar data collected during a data collection period for identifying motion in the passenger compartment 115, as described below. The data collection period may consist of a plurality of consecutive time-windows, as will be described below. The computer

105 may refrain from using the radar data received before the beginning of the data collection period, i.e., before a starting-time of the first time-window of the data collection period, to identify the motion inside the passenger compartment 115. The computer 105 may refrain from using the radar data received after a last time-window of the data collection period to identify the motion inside the passenger compartment 115.

When performing the identification of motion described below, the computer 105 uses the radar data collected during a time-window. The computer 105 may use the radar data collected during a single time-window at a time, i.e., use the radar data collected during one time-window in isolation, before moving on to use the radar data collected during the next time-window. Each time-window extends from a starting-time to an ending time. The starting-time and ending time are points in slow time. The time-window may have a preset duration, i.e., a preset length of time from the starting-time to the ending time. The preset duration may be stored in the memory of the computer 105. The preset duration may be chosen to provide sufficient data for the processes described below for identifying the motion. The computer 105 may store the radar data collected during each time-window in a buffer in the memory of the computer 105, and the computer 105 may clear the buffer upon the next time-window beginning. As described below, the starting-time is variable and thus not preset. The computer 105 may, upon determining the starting-time for a time-window, determine the ending time for the time-window by adding the preset duration to the starting-time.

The computer 105 may be programmed to determine a starting-time for a time-window based on a second derivative of the radar data. For example, the computer 105 may determine the starting-time for the first time-window of the data collection period, and thereby the beginning of the data collection period, based on the second derivative of the radar data. The second derivative of the radar data may be a second derivative of the fast time with respect to slow time of the selected signal 225 from the radar data. The computer 105 may perform the second derivative on the radar data, e.g., on the selected signal 225, after the application of one of the filters. The computer 105 may determine the starting-time as a slow time at which the second derivative first exceeds a threshold amount, e.g., as in the least value for x such that the following expression is satisfied:

$$\frac{d^2y}{dx^2} > K$$

in which y represents the fast time of the selected signal 225, x represents slow time, and K represents the threshold amount. The threshold amount K may be chosen to indicate movement of an object. The inventors have determined that the second derivative performs well at indicating a change of state of an object.

The computer 105 may be programmed to determine starting-times of time-windows in a data collection period after the first time-window of that data collection period. For example, the starting-time for a time-window may be the ending time of the immediately previous time-window. In other words, the time-windows in a data collection period may be consecutive, with each time-window starting when the previous time-window ends.

The computer 105 may be programmed to determine a final time-window for the data collection period based on the second derivative. For example, the computer 105 may determine that a current time-window is the final time-window in response to the second derivative being below a threshold amount for at least a threshold duration. The second derivative may be the same second derivative as described above, i.e., the second derivative of fast time with respect to slow time for the selected signal 225 after application of one of the filters. The threshold amount may be the same threshold amount K as used for the starting-time of the data collection period. The threshold duration is a length of time and may be chosen to be longer than repetitions of the types of motion that are of interest. Thus, in response to the second derivative being below the threshold amount for at least the threshold duration, the computer 105 may determine that the ending time of the current time-window is the end of the data collection period, and the computer 105 may refrain from using the radar data received after the current time-window to identify the motion inside the passenger compartment 115.

Figure 3:
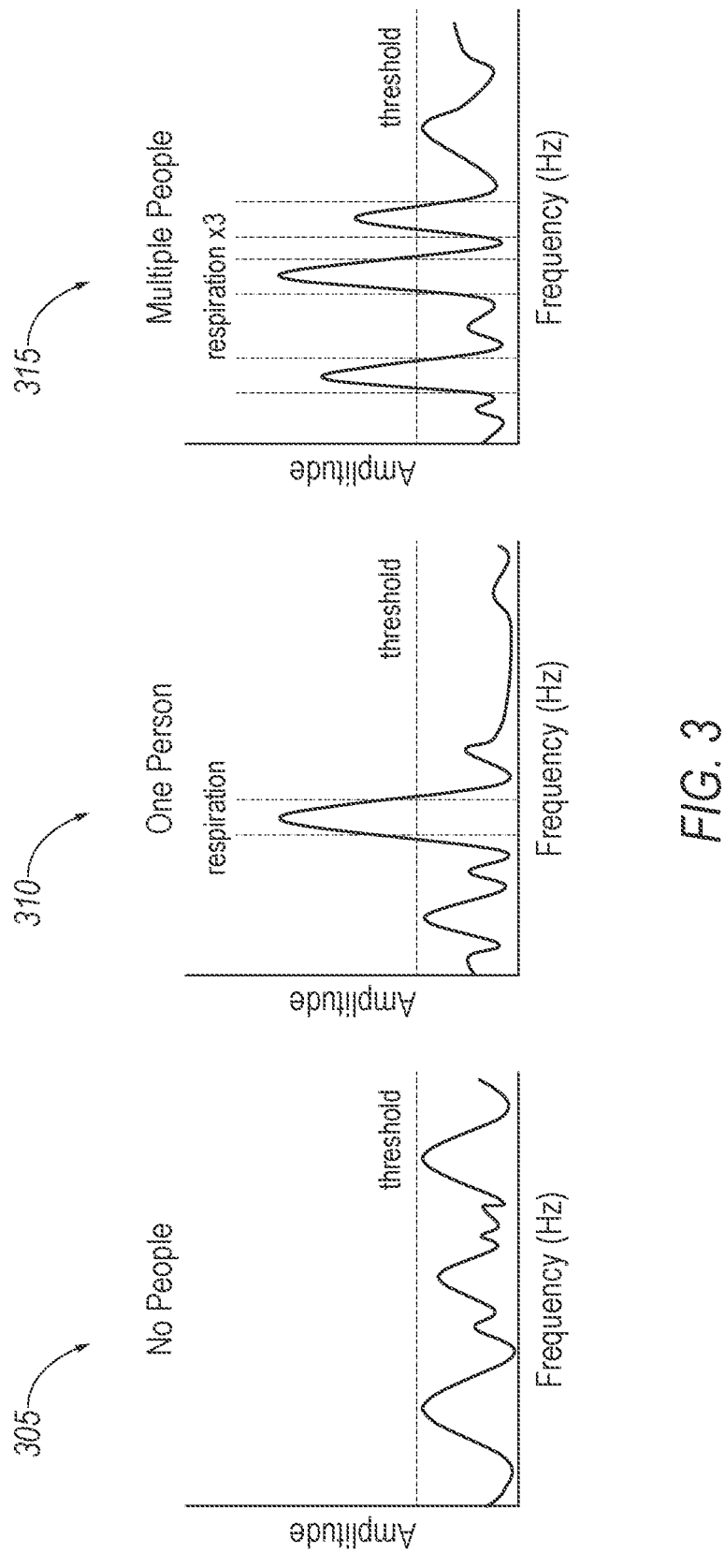
FIG. 3 shows example plots of amplitude versus frequency for example radar data.

With reference to FIG. 3, the computer 105 may be programmed to convert the radar data received during a time-window to a frequency domain. The conversion to the frequency domain generates a plot of the amplitude of the fast time versus frequency. For example, the computer 105 may convert the radar data received during the time-window to the frequency domain by applying a fast Fourier transform. The computer 105 may perform any suitable algorithm for computing the fast Fourier transform, e.g., Cooley-Tukey, prime-factor, Bruun's, Rader's, Chirp Z-transform, hexagonal, etc.

The computer 105 is programmed to identify a motion inside the passenger compartment 115 based on the radar data received during the time-window. The computer 105 may separately analyze the radar data filtered with the bandpass filter and the radar data filtered with the smoothing filter. The radar data filtered with the bandpass filter and the radar data filtered with the smoothing filter may be used to identify different types of motion. For example, the radar data filtered with the bandpass filter may be used to identify human respiration, e.g., a number of respirating individuals in the passenger compartment 115. For another example, the radar data filtered with the smoothing filter may be used to identify animate bulk motion, e.g., classify the motion as a type of animate bulk motion, e.g., a person sitting down into a seat 125, a person shifting in a seat 125, a child moving in a car seat installed on a seat 125, a dog laying down on a seat 125, etc. The term "animate" indicates that the motion is by a living being, and the term "bulk motion" indicates that the motion is large-scale motion as opposed to physiological processes such as respiration. For one or both of the radar data filtered with the bandpass filter and the radar data filtered with the smoothing filter, the computer 105 may identify the motion in the passenger compartment 115 based on that radar data in the frequency domain.

For example, the computer 105 may be programmed to identify a number of respirating individuals based on the radar data received during the time-window. The computer 105 may count a number of peaks exceeding a threshold amplitude in the radar data converted to the frequency domain. The threshold amplitude may be chosen to be above a typical noise level of the radar data in the frequency domain and below a typical amplitude of a person respirating. FIG. 3 shows a first plot 305 in which zero peaks exceed the threshold amplitude, indicating zero individuals detected respirating; a second plot 310 in which one peak exceeds the threshold amplitude, indicating one individual detected respirating; and a third plot 315 in which three peaks exceed the threshold amplitude, indicating three individuals detected respirating.

For another example, the computer 105 may classify the motion as a type of animate bulk motion based on the radar data received during the time-window. The classification of the motion may include a type of living being performing the motion and/or a type of action that the motion is. Types of living beings may include adult human, child, dog, cat, etc. Types of actions may include sitting down, shifting, turning a head, etc. Some actions may be specific to a type of being, e.g., sitting down for a person and laying down for a dog.

The computer 105 may classify the motion as a type of animate bulk motion by executing a neural network classifier with the radar data received during the time-window as an input. The neural network classifier may receive as an input the radar data received during one of the time-windows and filtered with the smoothing filter. The input radar data may be in the time domain or in the frequency domain. The neural network classifier may provide as an output a classification of the motion as a specific type, e.g., from a prestored list of types. The neural network classifier may be any suitable type of neural network, e.g., a convolutional neural network. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a down-sampling operation along spatial dimensions; and fully connected layers, which generate based on the output of all neurons of the previous layer. The final layer of the convolutional neural network generates a score for each potential type of motion, and the final output is the type with the highest score.

The neural network classifier may be trained to classify motions in training data. The neural network classifier during training may output a classification and a velocity for each motion. The training data may include radar data of different motions paired with ground-truth classifications and ground-truth velocities of the motions. The ground-truth classifications may be derived by performing object recognition on camera data that was recorded simultaneously with the training radar data. The ground-truth velocities may be the first derivative of fast time with respect to slow time for the selected signal 225 of the training radar data. The neural network classifier may be trained to minimize a loss function, e.g., via backpropagation. The loss function may include terms for a classification loss and a physics loss. The classification loss may penalize outputted classifications that do not match the ground-truth classifications. The physics loss may penalize the outputted velocity for a magnitude of the difference with the ground-truth velocity. The use of the physics loss can increase the accuracy of the classification outputted by the neural network classifier, compared with training using only the classification loss.

The computer 105 is programmed to actuate a component 120 of the vehicle 100 based on the identification of the motion. For example, the computer 105 may command the user interface to output an alert to an occupant 140 of the passenger compartment 115 based on the identification of the motion. The computer 105 may actuate the component 120 in response to the identification of the motion satisfying a condition. For example, the condition may be that the number of respirating individuals exceeds a threshold when the vehicle 100 is turned off. For another example, the condition may be the classification of animate bulk motion as a person moving from one seat 125 to another seat 125.

Figure 4:
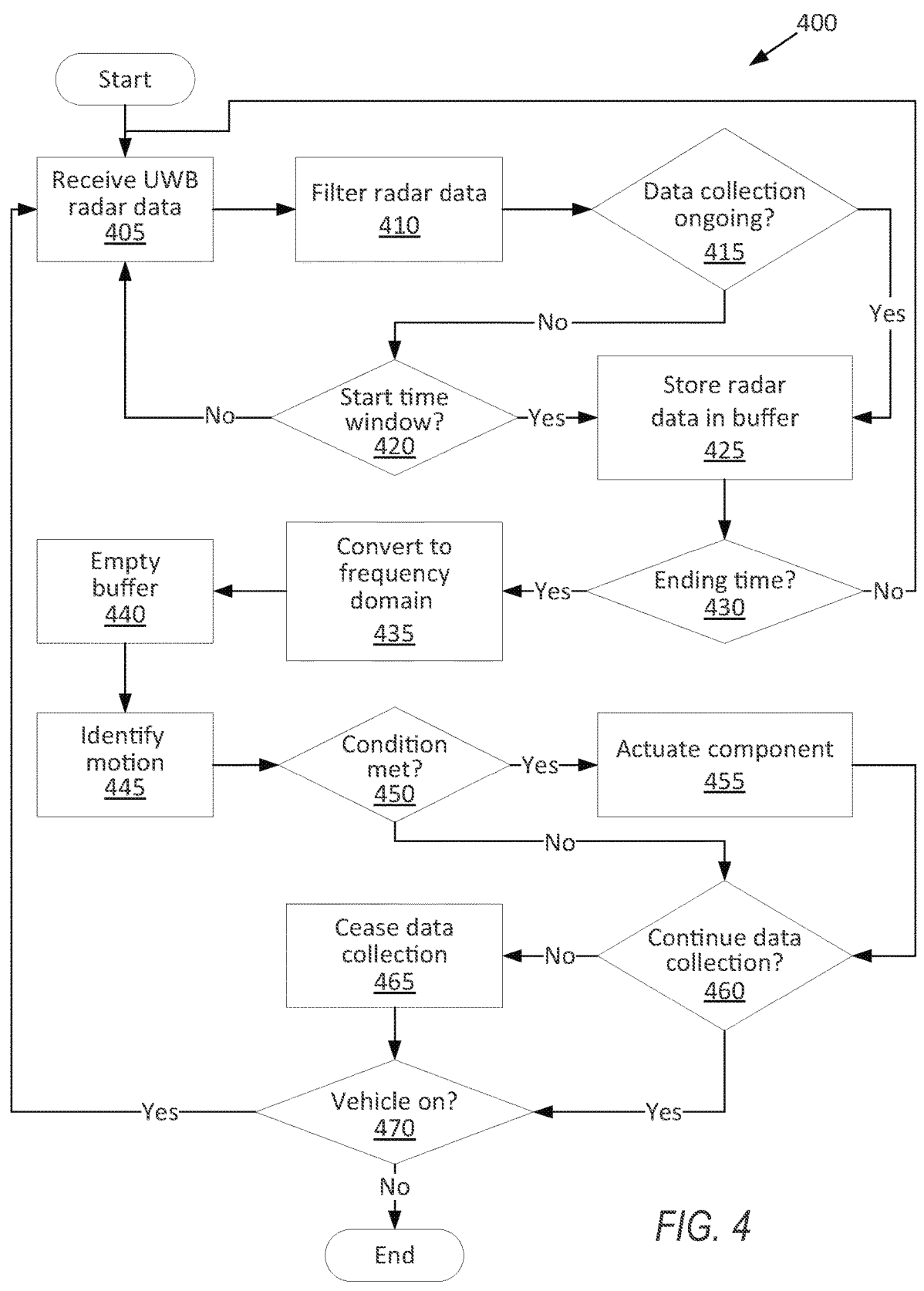
FIG. 4 is a flowchart of an example process for identifying motion in the passenger compartment based on the radar data.

FIG. 4 is a flowchart illustrating an example process 400 for identifying motion in the passenger compartment 115 based on the radar data. The memory of the computer 105 stores executable instructions for performing the steps of the process 400 and/or programming can be implemented in structures such as mentioned above. As a general overview of the process 400, the computer 105 receives the radar data and selects the selected signal 225 from the radar data and filters the radar data. If data collection is already started or the criteria for starting data collection are met, the computer 105 stores the radar data in a buffer in the memory of the computer 105 until the ending time of the time-window. The computer 105 then converts the radar data in the buffer to the frequency domain, empties the buffer, identifies the motion, and actuates the component 120 if the condition is met. The computer 105 ceases the data collection if the criteria for doing so are met. The process 400 continues for as long as the vehicle 100 remains on.

The process 400 begins in a block 405, in which the computer 105 receives the radar data from one of the UWB radars 110 in the passenger compartment 115 of the vehicle 100, as described above.

Next, in a block 410, the computer 105 selects the selected signal 225 from the radar data and applies the filters to the radar data, as described above.

Next, in a decision block 415, the computer 105 determines whether the data collection period is currently ongoing, i.e., if the data collection period has already started, as described above. For example, a flag in the memory of the computer 105 may indicate whether the data collection period is ongoing or is not currently being performed. In response to the data collection period not being started yet, the process 400 proceeds to a decision block 420. In response to the data collection period being ongoing, the process 400 proceeds to a block 425.

In the decision block 420, the computer 105 determines whether to start a first time-window of the data collection period, i.e., whether to designate a current time as the starting-time for the first time-window, based on the second derivative of the radar data, as described above. Upon designating the starting-time, the computer 105 sets the flag in the memory indicating that the data collection period is ongoing, and the process 400 proceeds to the block 425. In response to the current time not being at the starting-time, the process 400 returns to the block 405 to continue receiving the radar data.

In the block 425, the computer 105 stores the radar data in the buffer of the memory of the computer 105.

Next, in a decision block 430, the computer 105 determines whether the current time-window has reached the ending time, i.e., the end of the preset duration of the time-window, as described above, which may correspond to the buffer of the memory being full. In response to the time-window being incomplete, the process 400 returns to the block 405 to continue filling the buffer with the radar data. In response to the current time being at the ending time, the process 400 proceeds to the block 435.

In the block 435, the computer 105 converts the radar data received during the time-window to the frequency domain, as described above, and stores the converted radar data elsewhere in the memory.

Next, in a block 440, the computer 105 empties the buffer, i.e., deletes the time-domain radar data stored in the buffer, to make space for continuing to gather the radar data.

Next, in a block 445, the computer 105 identifies motions inside the passenger compartment 115 based on the radar data received during the time-window, as described above.

Next, in a decision block 450, the computer 105 determines whether any conditions for actuating the component 120 have been satisfied, as described above. In response to one of the conditions being satisfied, the process 400 proceeds to a block 455. In response to none of the conditions being satisfied, the process 400 proceeds to a decision block 460.

In the block 455, the computer 105 actuates the component 120 of the vehicle 100 based on the identification of the motion, as described above. After the block 455, the process 400 proceeds to the decision block 460.

In the decision block 460, the computer 105 determines whether a criteria for ceasing the data collection period has been satisfied, e.g., the second derivative is below the threshold amount for at least the threshold duration, as described above. In response to the criteria not being satisfied, the process 400 proceeds to a block 465. In response to the criteria being satisfied, the process 400 proceeds to a decision block 470.

In the block 465, the computer 105 sets the flag in the memory to indicate that the data collection period is not ongoing. The computer 105 thus refrains from using the radar data received after the current time-window to identify motions inside the passenger compartment 115. After the block 465, the process 400 proceeds to the decision block 470.

In the decision block 470, the computer 105 determines whether the vehicle 100 is still on. In response to the vehicle 100 still being on, the process 400 returns to the block 405 to continue gathering the radar data. In response to the vehicle 100 being turned off, the process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
    receive radar data from an ultrawideband radar in a passenger compartment of a vehicle;
    set a first starting-time for a first time-window in real time based on a second derivative of fast time in the radar data with respect to slow time in the radar data;
    identify a motion inside the passenger compartment based on the radar data received during the first time-window and based on the radar data received during a second time-window, the second time-window starting at an ending time of the first time-window; and
    actuate a component of the vehicle based on the identification of the motion.

2. The computer of claim 1, wherein the instructions further include instructions to refrain from using the radar data received before the first starting-time to identify the motion inside the passenger compartment.

3. The computer of claim 1, wherein the instructions further include instructions to convert the radar data received during the first time-window to a frequency domain, and identify the motion in the passenger compartment based on the radar data in the frequency domain.

4. The computer of claim 3, wherein the instructions further include instructions to convert the radar data received during the first time-window to the frequency domain by applying a fast Fourier transform.

5. The computer of claim 1, wherein the first time-window has a preset duration.

6. The computer of claim 1, wherein the instructions further include instructions to apply a filter to the radar data, and the second derivative is of the radar data after the application of the filter.

7. The computer of claim 6, wherein the filter is a smoothing filter.

8. The computer of claim 6, wherein the filter is a bandpass filter isolating frequencies for human respiration.

9. The computer of claim 1, wherein the instructions further include instructions to, in response to the second derivative being below a threshold amount for at least a threshold duration, refrain from using the radar data received after a current time-window to identify the motion inside the passenger compartment.

10. The computer of claim 1, wherein the instructions further include instructions to classify the motion as a type of animate bulk motion based on the radar data received during the first time-window.

11. The computer of claim 10, wherein the instructions further include instructions to classify the motion as a type of animate bulk motion by executing a neural network classifier with the radar data received during the first time-window as an input.

12. The computer of claim 1, wherein the instructions further include instructions to identify a number of respirating individuals based on the radar data received during the first time-window.

13. The computer of claim 1, wherein the instructions further include instructions to command a user interface to output an alert to an occupant of the passenger compartment based on the identification of the motion.

14. A method comprising:

receiving radar data from an ultrawideband radar in a passenger compartment of a vehicle;

setting a first starting-time for a first time-window in real time based on a second derivative of fast time in the radar data with respect to slow time in the radar data;

identifying a motion inside the passenger compartment based on the radar data received during the first time-window and based on the radar data received during a second time-window, the second time-window starting at an ending time of the first time-window; and actuating a component of the vehicle based on the identification of the motion.

15. The method of claim 14, further comprising refraining from using the radar data received before the first starting-time to identify the motion inside the passenger compartment.

16. The method of claim 14, further comprising converting the radar data received during the first time-window to a frequency domain, and identifying the motion in the passenger compartment based on the radar data in the frequency domain.

17. The method of claim 14, further comprising commanding a user interface to output an alert to an occupant of the passenger compartment based on the identification of the motion.

18. The computer of claim 1, wherein the instructions to set the first starting-time include instructions to, in real time, set the first starting-time to a time at which the second derivative of the fast time with respect to the slow time exceeds a threshold.

19. The method of claim 14, wherein setting the first starting-time includes, in real time, setting the first starting-time to a time at which the second derivative of the fast time with respect to the slow time exceeds a threshold.

* * * * *